United States Statutory Invention Registration [19]

[11] Reg. Number: H298

Moorhead [43] Published: Jul. 7, 1987

[54] OXIDATION RESISTANT FILLER METALS FOR DIRECT BRAZING OF STRUCTURAL CERAMICS

[75] Inventor: Arthur J. Moorhead, Knoxville, Tenn.

[73] Assignee: The United States of America as represented by the Department of Energy, Washington, D.C.

[21] Appl. No.: 838,492

[22] Filed: Mar. 11, 1986

Related U.S. Application Data

[62] Division of Ser. No. 751,414, Jul. 3, 1985, Pat. No. 4,596,354.

[51] Int. Cl.[4] ..... B23K 35/22; B23K 31/02

[52] U.S. Cl. ..... 228/263.19; 228/121; 228/122

[58] Field of Search ..... 228/121, 122, 263.11, 228/263.12, 263.13, 263.19, 263.21, 217; 420/460

[56] References Cited

U.S. PATENT DOCUMENTS 2,410,356 10/1959 Grala et al. ..... 420/460
2,515,184 1/1941 Bieber et al. ..... 420/460
3,620,718 11/1971 Freche et al. ..... 420/460
4,046,560 9/1977 Freche et al. ..... 420/460

*Primary Examiner*—Deborah L. Kyle
*Assistant Examiner*—Michael J. Carone
*Attorney, Agent, or Firm*—Katherine Lovingood; Stephen D. Hamel; Judson R. Hightower

[57] ABSTRACT

A method of joining ceramics and metals to themselves and to one another is described using essentially pure trinickel aluminide and trinickel aluminide containing small amounts of carbon. This method produces strong joints that can withstand high service temperatures and oxidizing environments.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OXIDATION RESISTANT FILLER METALS FOR DIRECT BRAZING OF STRUCTURAL CERAMICS

This is a division of application Ser. No. 751,414 filed July 3, 1985, now Pat. No. 4,596,354.

BACKGROUND OF THE INVENTION

This invention relates to the development of oxidation resistant brazing filler metals for direct brazing of ceramics to ceramics or ceramics to metals to form strong joints that can withstand high service temperatures. It was developed under a contract with the U.S. Department of Energy.

A key technology that will enhance or restrict the use of ceramic materials in high performance applications, such as advanced heat engines or heat exchangers, is the ability to reliably join simple-shape ceramic components to form complex assemblies or to join unit lengths of ceramic material to form large ceramic systems. Although ceramic joining technology has been highly developed over the past fifty years, very little has been done to develop brazing filler metals for joining ceramics for use at elevated temperatures, at high stress levels and in dirty environments.

Brazing of ceramics is considerably more difficult than brazing of metals, and the applicant knows of only one commercially available brazing alloy, sold under the trademark "Wesgo's Ticusil" (Ag–26.7–Cu–4.5–Ti wt. %) that will wet and bond to an oxide ceramic. However, the poor oxidation resistance of that alloy's constituents (Ag-Cu-Ti) and relatively low brazing temperature (950° C.) prevent its use in many high temperature applications.

There are basically two brazing processes that can be used for joining ceramics. One is indirect brazing, in which the ceramic is coated with an active metal prior to brazing with a nonreactive commercial filler metal, and the other is direct brazing with filler metals specially formulated to wet and bond to both metals and ceramics.

Direct brazing of ceramics is considerably more difficult than brazing of metals as most brazing filler metals will not wet a ceramic surface. Although some filler metals have been developed that wet some ceramic materials directly without the need for precoating, there are several factors that prevent the use of these filler metals in the advanced energy conversion applications under development today. Without exception, these filler metals contain one or more of the reactive elements titanium, zirconium or hafnium that promote bonding to oxide-base ceramics by reducing the oxide of the ceramic and forming Ti- Zr- or Hf-oxides at the ceramic/filler metal interface. Unfortunately, this same strong oxide forming tendency also creates a problem because the filler metal is inherently susceptible to corrosive oxidation upon long term exposure to the atmosphere at high temperatures. Another problem with many of the compositions previously developed is that they contain the toxic element beryllium, an undesirable material in today's commercial applications. Also, the melting range (or solidus temperature) of some of these compositions is too low for service at 1000°–1200° C., the temperature range under consideration for advanced heat engine applications.

Direct brazing does avoid the development and application of what is, in many cases, the very sophisticated and expensive coating or metallizing treatment required for indirect brazing. Also, the inclusion of the active metal within the filler metal more effectively protects the active metal from oxidation during storage or while brazing than when the pure active metal is first used to coat the ceramic. Finally, the strength of the bond between a coating and ceramic substrate, and the corrosion resistance of the coating does not have to be of concern in direct brazing. Although direct brazing offers the above advantages when used for joining ceramics, there is still a need to develop filler metals with improved oxidation resistance at high temperatures to avoid the shortcomings of previous compositions while retaining these advantages.

SUMMARY OF THE INVENTION

In view of the above-mentioned need it is an object of this invention to provide an oxidation resistant nontoxic filler metal for direct brazing of high purity structural ceramics to form strong joints that can withstand high service temperatures.

The invention is a method of joining ceramics and metals to themselves and one another by brazing in a nonoxidizing atmosphere at a temperature in the range from 1450° C. to 1550° C. (depending on the materials being joined) with a filler metal comprising trinickel aluminide having 23 to 25 at. %. aluminum, the balance nickel, or with the trinickel aluminide containing 23 to 25 at. % aluminum, 0.05 to 0.20 at. % carbon and the balance nickel. The invention is also a composite structure having at least two structural components of ceramics and metals joined to themselves or one another with a trinickel aluminide brazing filler metal containing 23 to 25 at. % aluminum and the balance nickel, or the trinickel aluminide containing 23 to 25 at. % aluminum, 0.05 to 0.20 at. % carbon and the balance nickel. In addition, the invention is a trinickel aluminide brazing alloy containing 23 to 25 at. % aluminum, the balance nickel and the trinickel aluminide containing 23 to 25 at. % aluminum, 0.05 to 0.20 at. % carbon and the balance nickel. This filler metal has the advantages over previous compositions of being resistant to oxidation and of containing no toxic constituents. The high melting point of the brazing filler metal also results in strong braze joints and allows service at high temperatures.

DETAILED DESCRIPTION OF THE PREFERRED EMBODIMENT

Much work has been done in recent years to develop methods of joining ceramics to ceramics or ceramics to metals for use in high temperature applications. A preferred technique is direct brazing wherein two components to be joined are brazed together using a filler metal that can wet and adhere to the respective surfaces of the components. One line of development for oxide-containing ceramics is the use of filler metals containing active elements that have strong oxide-forming tendencies. Interaction between the active element of the filler metal and the ceramic results in the reduction of a surface layer of the oxide with subsequent formation of an active element oxide that serves to bond the filler metals and the ceramic. Taking this into consideration, the $Ni_3Al$ system was chosen for study because it is known that active metals can be readily substituted for aluminum. This alloy system offers added advantages as well. The ordered intermetallic compounds based on nickel aluminide are typically resistant to oxidation to at least 1100° C. as the result of their ability to form protective aluminum oxide scales, aluminum oxide being one of the most stable of all oxide compounds. Also, the strong tendency for long-range order in these alloys reduces atomic mobility at elevated temperatures and results in good structural stability and resistance to high-temperature deformation (creep).

Investigation of the $Ni_3Al$ system with the substitution for the aluminum of varying amounts of the active metals titanium, zirconium, and hafnium as well as copper, and with micro additions of boron to increase ductility. Attempts made to braze ceramics using these substituted nickel aluminides were disappointing; none were successful. However, a surprising development came out of this experimentation. It was discovered that, although nickel aluminides containing active metals failed to wet and adhere to ceramics, pure $Ni_3Al$ and $Ni_3Al$ containing minute amounts (0.05–0.20 at. %) of carbon as a deoxidant gave unexpectedly favorable results. Not only will this alloy wet and adhere to oxygen-containing ceramics including high purity, high density aluminas such as those sold under the tradenames "Coors AD-99" (99% $Al_2O_3$) or "AD-998" (99.8% $Al_2O_3$), and "Degussit Al-23" (99.7% $Al_2O_3$), but it will also form strong joints with titanium diboride, sintered α-silicon carbide, and alumina-matrix composites containing either a dispersed metal or silicon carbide whiskers. Although developed for direct brazing of structural ceramics, these filler metals also readily wet and flow on refractory metal alloys such as those referred to as "T-111" (Ta-8W-2Hf) and "TZM" (Mo-0.05 Ti-0.08 Zr-0.03C) that are presently being considered for advanced nuclear reactors for space applications.

Sessile drop wettability studies were conducted on Coors AD-99 and AD-998 aluminas; Degussit AL-23 alumina; alumina-matrix composites containing Pt, Cr, or SiC as a second, toughness-enhancing phase; and a sintered silicon carbide ceramic manufactured under the tradename "Hexolloy SA" by the Carborundum Company, Niagara Falls, New York. The sessile drop apparatus is essentially a horizontal induction heating furnace, consisting of a fused silica tube 38 mm in diameter and 300 mm long, in which a vacuum of $5\times10^{-5}$ mm Hg and temperatures to 1750° C. can be obtained. After each run was made, the sample was removed from the tube, examined with a shadowgraph to measure the degree of wetting (contact angle) and then either sectioned for ceramographic examination or used for determination of the apparent shear strength of the bond between the drop and the ceramic substrate. The shear tests were conducted by a generally-accepted method, the Sutton push-off technique. In this test, a projection on a special test fixture shears the solidified sessile drop off the ceramic substrate. The bond strength was calculated from the load at failure divided by the interfacial area.

Flexural strength measurements were also conducted on ceramic-ceramic brazements made with these experimental brazing filler metals. Typically three or four bar-shaped specimens containing a braze joint across the middle are tested in a four-point bend fixture.

The filler metals studied have been made by either arc-melting and drop-casting into a water-cooled copper mold or by melt-spinning onto a rapidly rotating stainless steel wheel. The drop-cast material was either cut into small pieces or rolled into foil for brazing. Although brazing was done in vacuum ranging from $2\times10^{-4}$ mm Hg or lower, this would not preclude brazing in a high-purity, inert gas environment. The ceramic substrates were cleaned prior to brazing by degreasing in ethanol or acetone and then firing for 15 minutes in air at 800°–1000° C.

Example I

A series of sessile-drop wettability tests were conducted with a brazing filler metal having composition Ni-15 Al, at. % (86.1 Ni-13.9 Al, wt. %) on various commercial alumina substrates. The filler metal was in the form of 1 mm cubes cut from a drop-cast 125 g billet. Brazing was done in vacuum that was less than $5\times10^{-5}$ mm Hg at the start of heating. Heat was provided by induction heating of a molybdenum susceptor. Brazing temperatures ranged from 1450°–1585° C. The results of these tests, listed in Table I, show that wetting of the ceramics was achieved in all cases (wetting angle ≦90°), and that adherence ranged from good (24–35 MPa or 3.5 to 5 ksi) to outstanding 185°–300° MPa (27–44 ksi).

TABLE I

| Specimen Number | Substrate | Brazing[a] Temperature (°C.) | Wetting Angle | Shear Strength (MPa) | Shear Strength (Ksi) |
|---|---|---|---|---|---|
| 253 | AD-99 | 1585 | 70 | 44 | 6.4 |
| 256 | AD-99 | 1580 | 90 | 24 | 3.5 |
| 267 | AD-99 | 1500 | 90 | 42 | 6.1 |
| 278 | AD-99 | 1450 | 90 | 55 | 8.0 |
| 278 | AD-99 | 1450 | 90 | 36 | 5.2 |
| 279 | AL-23 | 1550 | 75 | 71 | 10.3 |
| 281 | AL-23 | 1530 | 75 | 92 | 13.3 |
| 286 | AL-23 | 1550 | 70 | 185 | 26.8 |
| 286 | AL-23 | 1550 | 70 | 300 | 43.5 |
| 329 | AD-998 | 1550 | 80 | 35 | 5.1 |
| 333 | AL-23 | 1550 | 85/90 | 29 | 4.2 |
| 405 | AD-998 | 1550 | 85 | 90 | 13.0 |

[a]All brazing was done in vacuum of $<5\times10^{-5}$ mm Hg at start of cycle, $\sim2\times10^{-4}$ mm Hg at temperature.

Example II

Flexural strength measurements were conducted on a SiC-SiC brazement made in vacuum at 1550° C. with the Ni-25 Al filler metal. The test specimens were made by butting together two sintered α-SiC coupons and preplacing small cubes of filler metals on the joint. After brazing, the surfaces of the coupons were ground to remove excess filler metal and then four bend bar specimens were cut out. These specimens were tested in a side-bend configuration in a four-point bend fixture. Average flexural strength of the four specimens was 160 MPa (23 ksi) with a standard deviation of 24 MPa. Although the flexural strength is lower than that of the silicon carbide, it is still about four times that of a braze material presently used in industry to join silicon carbide.

Example III

Sessile drop wettability studies and subsequent bond shear strength measurements were conducted on a series of three filler metals consisting of Ni-25 Al, at. %, with carbon additions of 0.05, 0.1 and 0.2 at. %. These alloys were made by remelting 1 gram portions of Ni-25 Al, at. %. The data from these tests (Table II) indicate an improvement in adherence over the pure $Ni_3Al$ (Table I) when the carbon content is 0.1 at. %, with poorer strength at carbon levels either above or below that value. The wetting angles does not seem to change significantly as the result of the carbon additions.

TABLE II

| Specimen Number | Substrate | Brazing[a] Temperature (°C.) | Wetting Angle | Shear Strength (MPa) | Shear Strength (Ksi) | Remarks |
|---|---|---|---|---|---|---|
| | | Ni—24Al—0.05C, at. % | | | | |
| 268 | AD-99 | 1500 | 80 | 45 | 6.5 | |
| 283[b] | AL-23 | 1530 | 75 | 231 | 33.5 | |
| 283 | AL-23 | 1530 | 75 | 106 | 15.4 | |
| 287 | AL-23 | 1550 | 80 | | | DNA[c] |
| 287 | AL-23 | 1550 | 80 | | | DNA[c] |
| 402 | AL-23 | 1550 | 80 | 24 | 3.5 | |
| 410 | AD-998 | 1550 | 80 | 79 | 11.5 | |
| | | Ni—25Al—0.1C, at. % | | | | |
| 257 | AD-99 | 1580 | 75 | 39 | 5.7 | |
| 282 | AL-23 | 1560 | 75 | 305 | 44.2 | |
| 282 | AL-23 | 1560 | 70 | 178 | 25.8 | |
| 288 | AL-23 | 1550 | 70 | 214 | 31.0 | |
| 288 | AL-23 | 1550 | 70 | 383 | 55.6 | |
| 403 | AL-23 | 1550 | 80 | 46 | 6.7 | |
| 411 | AD-998 | 1550 | 80 | 67 | 9.7 | |
| | | Ni—25Al—0.2C, at. % | | | | |
| 254 | AD-99 | 1580 | 75 | 111 | 16.1 | |
| 269 | AD-99 | 1500 | 80 | 51 | 7.4 | |
| 284 | AL-23 | 1580 | 70 | 109 | 15.8 | |
| 289 | AL-23 | 1550 | 70 | | | DNA |
| 289 | AL-23 | 1550 | 70 | 312 | 45.8 | |
| 404 | AL-23 | 1550 | 80 | 60 | 8.7 | |

[a]All brazing in vacuum of $<5 \times 10^{-5}$ mm Hg at start of cycle, $\sim 2 \times 10^{-4}$ mm Hg at temperature.
[b]Samples having the same number were brazed at the same time.
[c]DNA —did not adhere.

One of the continuing problems in brazing of ceramics or metals is preventing the formation of surface films, generally oxides, on the filler metal that will prevent wetting and subsequent bonding to the substrate. To prevent or at least minimize such film formation, brazing is generally done in an inert atmosphere or vacuum. An alternative is to braze under the reducing conditions provided by a dry hydrogen atmosphere that reduces the degree of oxidation or by using a flux that dissolves oxides that form. In brazing ceramics, filler metal compositions are generally selected on the basis of their ability to form at the filler metal/ceramic interface stable oxides in the case of oxide ceramics or carbides in the case of carbide ceramics such as SiC. It is also thought that there is some value in having a capcity in the molten filler metal for dissolving oxygen or oxides. It is presently unclear whether this ability to dissolve oxygen is beneficial because (1) it removes wetting-inhibiting films from the filler metal so that the filler metal and substrate can come in intimate contact, or (2) because it aids in lowering the solid-liquid interfacial energy. In fact, these two factors may be in conflict because the presence of alloy additions that are strong oxide formers will rapidly reduce the oxygen solubility in the liquid melt. The formation and reduction of oxide films in brazing filler metals have been considered from a thermodynamic standpoint and it is believed that the use of carbon additions and vacuum brazing is more strongly reducing and can remove oxygen at much higher rates than can a very dry hydrogen atmosphere. For whatever reason, the carbon additions were very beneficial because results were more reproducible.

Trinickel aluminides can directly braze ceramics and metals, resist high temperature oxidation and contain no toxic elements. Their use as filler metals has many advantages including being able to withstand high temperatures, being very strong and having the ability to be made ductile using microalloying techniques. Adding carbon to the trinickel aluminide brazing filler metal results in better strength and better reproducibility.

I claim:

1. A brazing filler metal for joining ceramics and metals to themselves and to one another consisting essentially of 23 to 25 atomic percent aluminum and the balance nickel.

2. The brazing filler metal of claim 1 consisting of 23 to 25 atomic percent aluminum, 0.05 to 0.20 atomic percent carbon and the balance nickel.

* * * * *